(No Model.) 2 Sheets—Sheet 1.

J. R. DAVIS.
COKE CRUSHER.

No. 252,743. Patented Jan. 24, 1882.

Witnesses
D. Williams
Harry Smith

Inventor
Josiah R. Davis
by his Attorneys
Howson & Son (No Model.)  2 Sheets—Sheet 2.

J. R. DAVIS.
COKE CRUSHER.

No. 252,743. Patented Jan. 24, 1882.

Witnesses
D. Williams
Harry Smith

Inventor
Josiah R. Davis
by his Attorneys
Howson & Sons

UNITED STATES PATENT OFFICE.

JOSIAH R. DAVIS, OF GREENSBURG, PENNSYLVANIA.

COKE-CRUSHER.

SPECIFICATION forming part of Letters Patent No. 252,743, dated January 24, 1882.

Application filed May 3, 1881. (No model.)

*To all whom it may concern:*

Be it known that I, JOSIAH R. DAVIS, a citizen of the United States, residing in Greensburg, Westmoreland county, Pennsylvania, have invented certain Improvements in Coke-Crushers, of which the following is a specification.

The main object of my invention is to so construct a coke-crushing machine that the rapid, uniform, and thorough reduction of the material operated upon will be effected, further objects being to readily vary the capacity of the machine and the size of the product, and to facilitate the proper construction of the toothed rollers employed.

Figure 1:
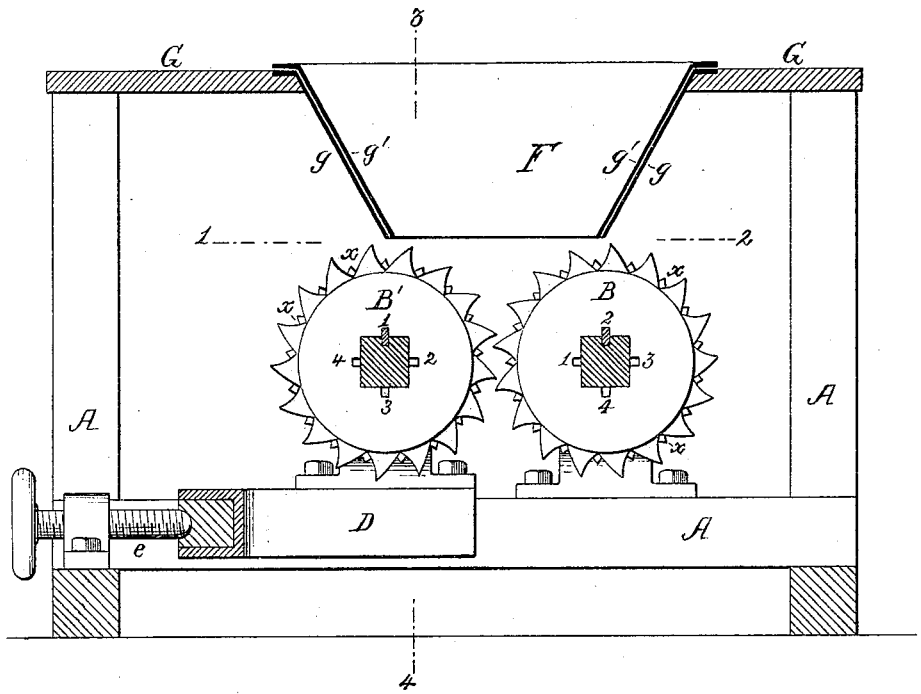
Figure 4:
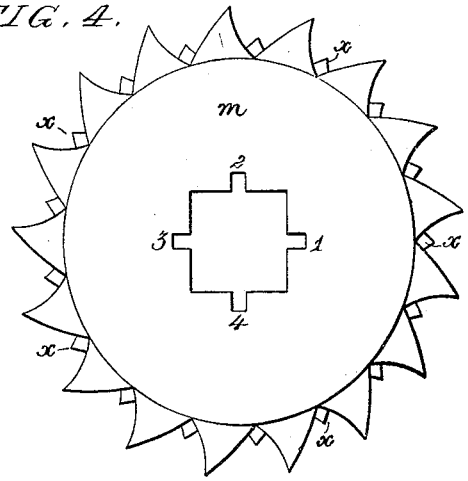
Figure 5:
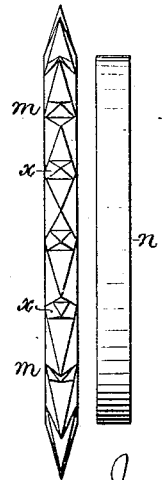
Figure 2:
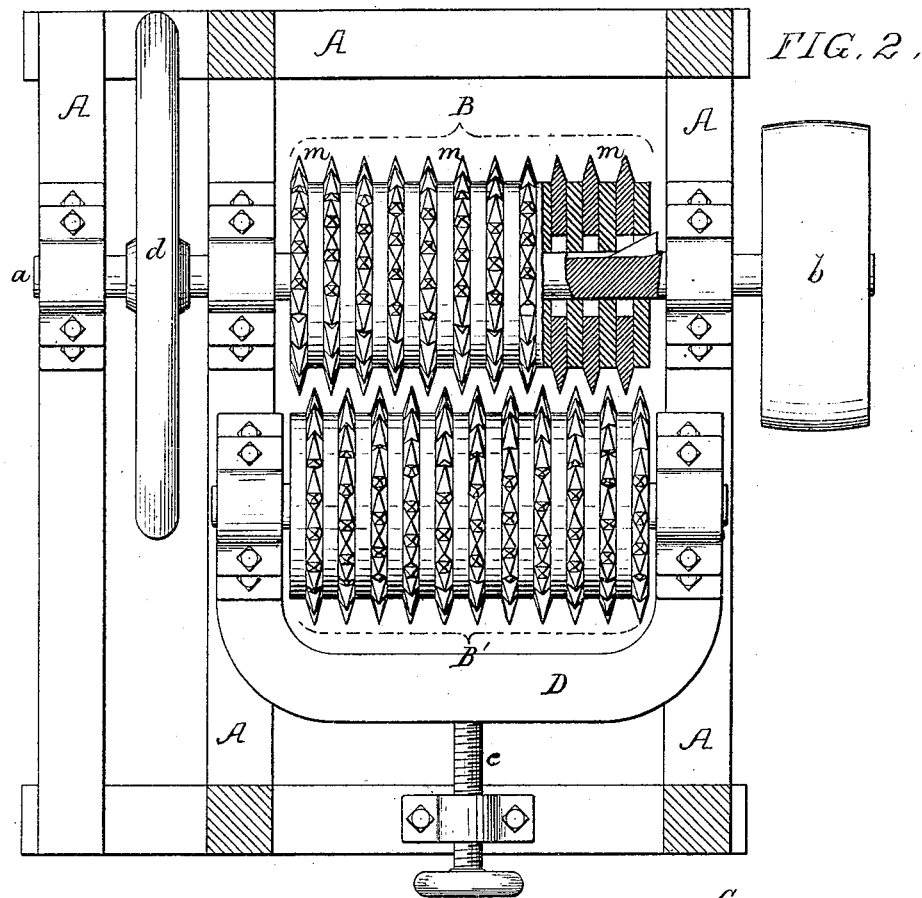
Figure 3:
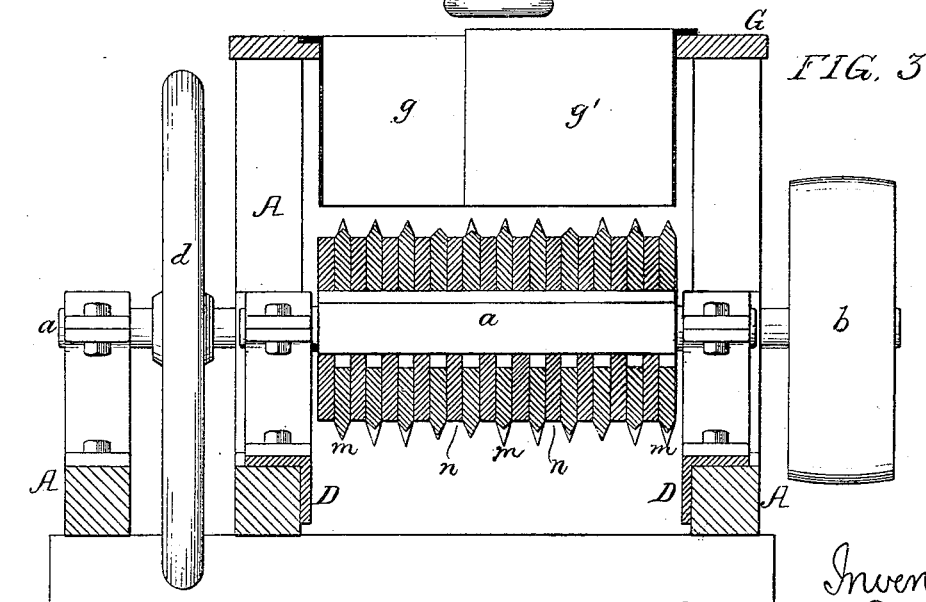

In the accompanying drawings, Figure 1, Sheet 1, is a longitudinal section of the machine; Fig. 2, Sheet 2, a sectional plan on the line 1 2, Fig. 1; Fig. 3, a transverse section on the line 3 4, Fig. 1; Fig. 4, Sheet 1, a side view of one of the toothed rings of the crushing-rollers, drawn to an enlarged scale; and Fig. 5, an edge view of said ring and of one of the filling rings or washers of the roller.

A is a substantial frame-work, of wood or iron, having bearings for a shaft, $a$, which carries one of the crushing-rollers B, said shaft being also furnished with a belt-wheel, $b$, and fly-wheel $d$.

To guides on the main frame A is adapted a sliding frame, D, which has bearings for the shaft of the other crushing-roller, B', said frame D being adjusted by means of the screw $e$, which is adapted to a nut on the fixed frame and bears against a block on the sliding frame. Each crushing-roller consists of a series of toothed rings, $m$, and plain rings $n$, arranged alternately and secured to the shafts $a$, as described hereinafter, that portion of each shaft which carries the rings being preferably made of square or other angular cross-section, in order to prevent the rings from turning thereon. As many rings may be used as the desired length of the roller may suggest, the end rings of each roller being secured against longitudinal displacement by suitable taper keys or other equivalent means.

F is the feed-hopper, which is supported above the rolls B B' by an elevated platform, G. In order that the hopper may be adjusted in length to accord with the length of the crushing-rolls, said hopper is made in two parts, $g$ $g'$, each part comprising an end plate, side plates, and top flanges, the side plates and flanges of one part overlapping those of the other part, so that the hopper can be laterally contracted or expanded until its end plates correspond with the end rings of the rollers. The lumps of coke fed through the hopper are caught between the rolls B B', and are crushed and torn thereby, the roll B' being caused to turn by the action of the power-driven roll B on the lumps of coke caught between the two rolls, and the size of the pieces of crushed coke being determined by the adjustment of the movable roll in respect to the fixed roll.

It is necessary to use comparatively large tearing-teeth on the rings $m$, and in order to reduce the space between the teeth I arrange between the base of the large teeth smaller teeth $x$, as shown in Fig. 4. The toothed rings of one roll may be in line with the toothed rings of the other roll, if desired; but it is preferable to arrange the rings as shown in Fig. 2—that is to say, with the toothed rings of one roll in line with the spaces between the toothed rings of the other roll. All of the rings $m$ are alike; but the rings are so arranged in respect to each other on the shafts $a$ that the teeth of each roll are disposed in spiral courses, as shown in Fig. 2, on reference to which it will be observed that the teeth of the second ring are set slightly ahead of those of the first ring and the teeth of the third ring ahead of those of the second, and so on.

In order to facilitate the arrangement of the rings $m$ on the shafts $a$ in such a manner as to effect this spiral disposition of the teeth on the roll, the square openings in the rings have in each side a key-slot, and these key-slots occupy different relations to the teeth of the ring, so that by numbering or otherwise properly designating each slot a ready means is afforded of properly arranging the successive rings on the shaft. Owing to the angular shape of the shaft, moreover, the rings cannot turn thereon, and the keys are thus relieved from strain due to such movement, so that I am, as before stated, enabled to use simple taper keys at each end of the shaft to maintain the rings in their proper longitudinal position, thus dispensing with adjustable collars and set-screws.

It will be observed that the teeth of the rings $m$, in addition to being tapered from top to bottom, are curved forward in the form of hooks, this construction being necessitated by the tough and fibrous character of the material to be crushed.

I do not desire to claim broadly a crushing-machine consisting of a pair of toothed rolls, each composed of alternating toothed and plain rings; but

I claim as my invention—

1. The combination, in a machine for crushing coke, of a pair of rolls, each consisting of rings having large teeth with contiguous bases, and smaller teeth between said large teeth, as set forth.

2. The combination of the crushing-rollers, each consisting of a series of toothed rings, with a hopper made in two parts, $g$ $g'$, each comprising an end plate and side plates, the side plates of one overlapping and being guided by the side plates of the other, whereby lateral expansion and contraction of the hopper are permitted, as set forth.

3. The combination of the angular shaft having a key-seat with toothed rings having corresponding angular openings and key-seats, as set forth.

In testimony whereof I have signed my name to this specification in the presence of two subscribing witnesses.

JOSIAH REES DAVIS.

Witnesses:
 AMOS STECK,
 CHAS. L. CLARKE.